US008707405B2

(12) United States Patent
O'Donnell et al.

(10) Patent No.: US 8,707,405 B2
(45) Date of Patent: Apr. 22, 2014

(54) REFRESHING GROUP MEMBERSHIP INFORMATION FOR A USER IDENTIFIER ASSOCIATED WITH A SECURITY CONTEXT

(75) Inventors: William J. O'Donnell, Fichburg, WI (US); Paul William Bennett, Austin, TX (US); Elisa Ferracane, Austin, TX (US); Michael Craig Thompson, Austin, TX (US); Michael Dettlaff Christopher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/348,466

(22) Filed: Jan. 11, 2012

(65) Prior Publication Data
US 2013/0179952 A1 Jul. 11, 2013

(51) Int. Cl.
H04L 29/06 (2006.01)
(52) U.S. Cl.
USPC .................................. 726/6; 726/10
(58) Field of Classification Search
USPC ........................................ 726/6, 10
See application file for complete search history.

(56) References Cited

U.S. PATENT DOCUMENTS

2007/0006297 A1 1/2007 Verbowski et al.
2009/0138525 A1* 5/2009 Mattox et al. .................. 707/201
2010/0030805 A1* 2/2010 Hinton et al. ............... 707/104.1
2010/0049968 A1 2/2010 Dimitrakos et al.
2012/0060210 A1* 3/2012 Baker et al. ....................... 726/9

OTHER PUBLICATIONS

Balfe, Shane, et al. "Key refreshing in identity-based cryptography and its applications in MANETs." Military Communications Conference, 2007. MILCOM 2007. IEEE. IEEE, 2007.*
Nagaratnam et al, "The Security Architecture for Open Grid Services," Jul. 17, 2002, Version 1.
Jiang et al, "Multiple Key Sharing and Distribution Scheme With (n,t) Threshold for NEMO Group Communications," IEEE Journal on Selected Areas in Communications, vol. 24, No. 9, Sep. 2006.
Colegrove et al, "Group Security Policy Token v1 (RFC 4534)," Internet Society Requests for Comment (RFCs), Jun. 1, 2006.

* cited by examiner

*Primary Examiner* — Kambiz Zand
*Assistant Examiner* — Michael Guirguis
(74) *Attorney, Agent, or Firm* — Jeffrey S. LaBaw; David H. Judson

(57) ABSTRACT

A method for selectively refreshing group membership for an identifier associated with an authenticated user. The identifier represents an application server security context, and it is generated to enable a user credential associated with the authenticated user to be persisted. Following such authentication, the client is provided with a time-bounded, renewable security token. The method begins by configuring an option whether group membership information is refreshed during renewal of an expired security token. During renewal of an expired security token, the method determines whether the option is set. If so, an attempt is made to refresh information. This attempt performs a set of checks to verify certain conditions. If these checks are valid, the identifier is refreshed and the security token renewed with updated group membership information. If any check is not valid, the identifier is refreshed and the security token renewed with existing information.

25 Claims, 3 Drawing Sheets

REFRESHING GROUP MEMBERSHIP INFORMATION FOR A USER IDENTIFIER ASSOCIATED WITH A SECURITY CONTEXT

BACKGROUND OF THE INVENTION

1. Technical Field

This disclosure relates generally to web application security and in particular to a method and system for allowing control over a group membership within a security domain.

2. Background of the Related Art

The Java™ Platform, Enterprise Edition (Java EE) standard supports the notion of declaring security constraints for Web-based applications using XML (outside of the application code). In addition, JEE standards put the control of security into a container, which removes the control of security from the application developer. Currently, an application server supporting this standard offers the ability to allow a Web container or an Enterprise JavaBean (EJB) container to handle the authentication process on behalf of Java applications executing on or in association with the server. As defined in the Standard, once a user has been authenticated, a Java "Subject" is created so that user credential information can be persisted for the duration of the executing Java application.

Commercial application servers that are compliant with this Standard, such as IBM® WebSphere® Application Server (WAS), provide for the use of Lightweight Third Party Authentication (LPTA) tokens to maintain security context between requests. For example, a user launching a protected Web-based application is challenged for a user identifier (userID) and password. Once the userID and password have been verified, a Subject representing the user is created. In addition, typically a Standard-compliant application server of this type sends a security token back to the client browser. For example, the WebSphere Application Server will send back an LTPA token in the form of a cookie. This token maintains the security context information during the life of the security token and the use of the Web application so that the user does not need to re-authenticate.

A user typically is a member of a group and, as such, as certain privileges and permissions (that are associated with the group membership). One of the challenges of the LPTA token-based approach, however, is that, once the Subject is created, any changes to the user's group membership information will not be known. For example, a userID's group membership may be modified following authentication; however, there is no mechanism available in the application server to enable the Subject to reflect such a change. This is particularly problematic when long-running transactions are executing.

BRIEF SUMMARY

According to this disclosure, a method is described for selectively refreshing group membership for an identifier (e.g., a Java Subject) associated with an authenticated user. The identifier represents or is associated with an application server security context, and typically the identifier is generated to enable a user credential associated with the authenticated user to be persisted. Following such authentication, the authenticated user's client is provided with a security token. The security token, although renewable, typically is time-bounded and thus expires after a given time period.

The method begins by configuring an option to control whether group membership information is refreshed automatically during renewal of an expired security token associated with the identifier. Then, during renewal of an expired security token, the method determines whether the option is set to a given value (e.g., true). If so, an attempt is made to refresh group membership information associated with the identifier. This attempt performs a set of checks to verify certain conditions. These checks include determining if a security realm in the security context matches a current realm, determining if the identifier was generated with a given application server type or instance, and determining if updated group membership information can be retrieved. If these checks are valid, the identifier is refreshed and the security token renewed with the updated group membership information. If any of the checks are not valid, the identifier is refreshed and the security token renewed with existing group membership information.

In an alternative embodiment, the above-described method is performed in an apparatus, such as an apparatus implemented an application server instance.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
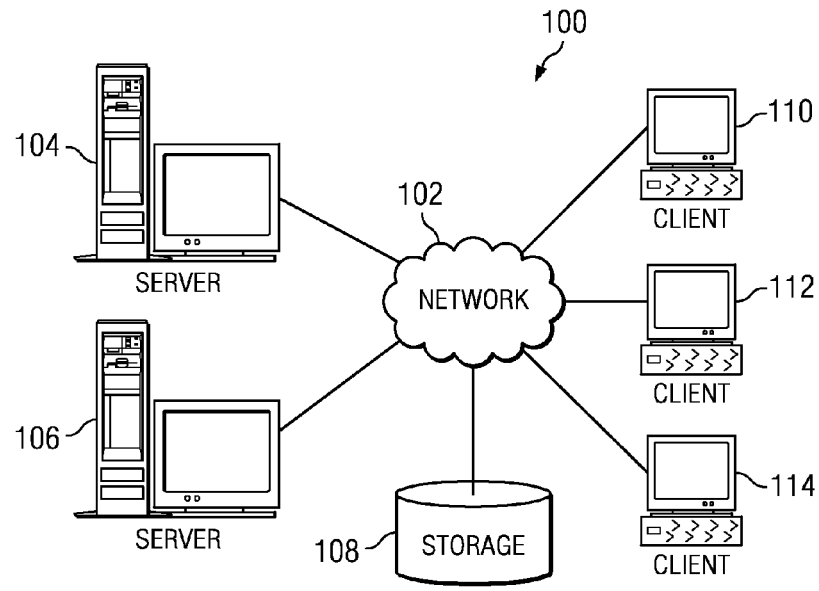
FIG. 1 depicts an exemplary block diagram of a distributed data processing environment in which exemplary aspects of the illustrative embodiments may be implemented.
Figure 2:
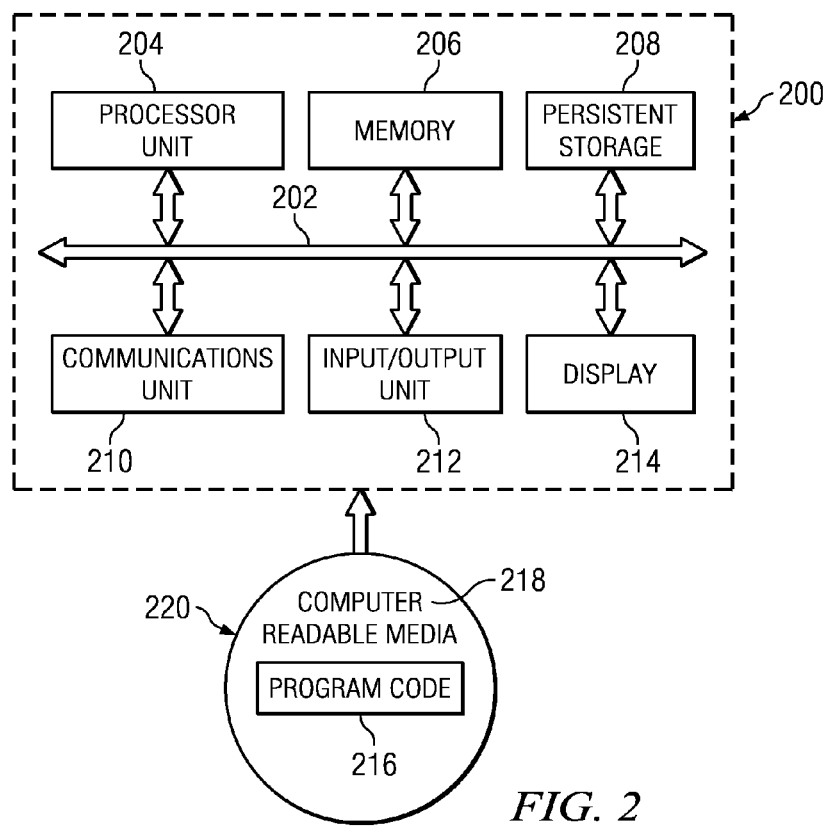
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus.

Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

The data processing system in FIG. 2 may comprise an application server. As is well-known, an application server is a software framework that provides an environment for a client device to use an application. The application server can be implemented on a number of different hardware devices. For example, the application server may comprise several server computers at different locations, such as illustrated in FIG. 1. Different parts of a transaction may be performed by different server computers. To maintain security and track a user's transaction, the application server may require the user to authenticate. For example, the user may enter a user identifier and password. The application server then creates a representation of the user from information about the user. This representation is sometimes referred to herein as an "identifier." In the context of a JEE-Standard compliant application server, the identifier is a Java "Subject." The application server uses the representation of the user to associate the user with the transaction, such as a transaction involving a web application. Preferably, the application server maintains the representation of the user for the duration of the transaction. The representation of the user can be passed to the different server computers that perform the transaction. Additionally, when the user authenticates to the application server, the application server may return a token (or "security token") to the user's device. The security token maintains a security context across one or more requests. In the JEE-Standard compliant application server, the token may be an LPTA token. When the user's device sends a request to the application server, the user's device typically includes the token in the request. The token advantageously allows the server computer that receives the request to identify the user without requiring the user to re-authenticate. Thus, the token allows the user to remain logged in to more than one server computer. After the user has been authenticated to the application server, the server appears to the user as a single server computer even if comprises several server computers at different locations.

A web server or a proxy server may be associated with an application server. In this context, so-called "realms" may protect resources like files, directories, images, application resources, or the like. Typically, realms assign certain systems to trusted groups of systems using a web server, or they may protect and control access using a proxy server. When accessed using an application client, such as a web browser using Hypertext Transfer Protocol (HTTP), web servers return a HTTP response code of "401" if these resources are not accessed using proper authentication information; similarly, proxy servers return an HTTP response code of "407" if the resources are not accessed using proper authentication information. Along with a "401" or "407" response code, the web server or the proxy server, as the case may be, responds with certain other information, such as the name associated with the protection area, the host name, and/or IP address of the machine that is trying to protect these resources, or other optional entities. This information may be called the realm or the authentication mechanism. This information may also be called a web server realm (if web server is protecting the resource) or proxy server realm (if a proxy server is involved in the protection). Realms may use a variety of authentication mechanisms, including but not limited to, NT LAN Manager (NTLM), Kerberos™, Integrated Windows Authentication (IWA), Simple and Protected GSSAPI Negotiation Mechanism (SPNEGO), or the like.

Figure 3:
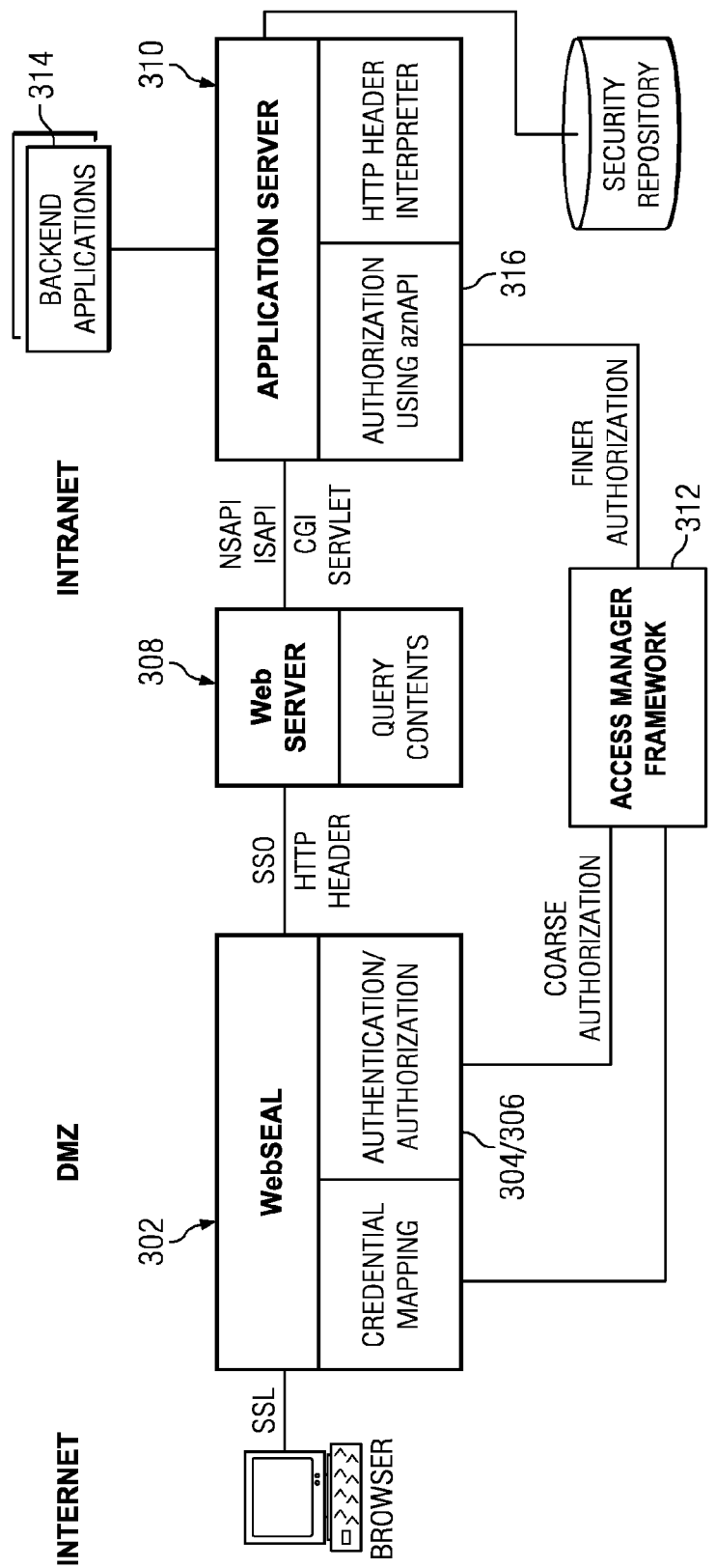
FIG. 3 illustrates a Web portal having an access management framework in which the subject disclosure may be implemented.

By way of further background, a web-based application environment such as described above typically includes a session management component. Session management typically is provided in association with an access manager, which is a component that prevents unauthorized use of resources, including the prevention of use of a given resource in an unauthorized manner. A representative access manager is the Tivoli® Access Manager for e-business (TAMeb) product, which is available commercially from IBM, and is represented in FIG. 3. Of course, the identification of this commercial product is not meant to be taken to limit the disclosed subject matter. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. This component is responsible for the session management of users.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

TAM provides a reverse proxy, web plug-in or the like that provides session management functionality and that includes authorization functionality as part of this session management. Authentication is handled by TAM, meaning that TAM collects a user's authentication credentials, evaluates them, and establishes a session, including some form of session management functionality (such as a session cookie). To provide a user with the advantages of this consolidated environment, TAM then provides a single sign-on solution for the user by asserting authentication credentials (such as username/password) to the back-end applications. This allows the back-end application to be added to the portal environment without modification.

In a representative implementation, IBM WebSphere® Application Server provides embedded IBM® Tivoli® Access Manager client technology to secure WebSphere Application Server-managed resources. WebSphere Application Server supports the Java Authorization Contract for Containers (JACC) specification. JACC details the contract requirements for Java EE containers and authorization providers. With this contract, authorization providers perform the access decisions for resources in Java EE application servers such as WebSphere Application Server. The Tivoli Access Manager security utility that is embedded within WebSphere Application Server is JACC-compliant and is used to add security policy information when applications are deployed, and to authorize access to WebSphere Application Server-secured resources. When applications are deployed, the embedded Tivoli Access Manager client takes any policy and or user and role information that is stored (within an application deployment descriptor or using annotations) and stores it within the Tivoli Access Manager Policy Server. The Tivoli Access Manager JACC provider is also called when a user requests access to a resource that is managed by WebSphere Application Server.

The implementation environment shown in FIG. 3 is not intended to limit this disclosure but rather merely to illustrate a representative application server environment in which the group membership information refresh functionality may be implemented.

As used herein, "group membership information" refers to any "grouping" associated with a user and his or her access to a protected resource. Such information typically defines the organizations, divisions, entities, groups, sub-groups or the like to which a user belongs, as well as the privileges and permissions associated with any such grouping. As used herein, group membership information should be broadly construed to mean any such data, in whatever form, that defines the user into a defined organization-centric and/or resource-centric category with one or more other similarly-situated users.

Refreshing Group Membership Information for a Security Context

With the above as background, the subject matter of this disclosure is now described.

As described, preferably the group membership information refresh techniques herein are implemented in (or in association with) an application server that supports security updates as defined in the Java 2 Enterprise Edition (JEE) Standard, and the associated Java™ Servlet 3.0 specification (JSR315). One such security update provides for the dynamic updating of a servlet security configuration. The term "refresh" as used herein should be broadly construed to refer to refreshing, updating, modifying pre-existing information to create new information, re-issuing pre-existing information as new, and the like.

The application server is enhanced to provide a configuration option (e.g., at a security configuration layer) to control whether group membership information is updated automatically upon renewal of an expired (or expiring) security token. In this manner, an administrator or other permitted entity (including, without limitation, a person, or a programmatic entity) has the ability to set the control to determine whether such automated refreshing capability is turned on or off. Preferably, setting the value "true" provides that groups (or certain defined groups, or sub-groups, or the like) are automatically refreshed (based on certain conditions being valid) when a security token is true. Conversely, setting the value "false" indicates that the groups (or certain defined groups, or sub-groups, or the like) are not automatically refreshed. By default, the control may be set as "false," although this is not a limitation. A web-based user configurator (e.g., implemented as a web page or set of pages) may be used to configure the option (or override an existing setting).

In one embodiment, the application server is IBM WebSphere Application Server v8. This application server includes a configuration service that includes a web application console that displays one or more pages to facilitate the configuration operation. Using the technique described herein, a refresh group option property is set to specify the desired configuration. In such case, the property is a "refreshGroups" option that is located in a configuration file, such as . . . "/ . . . wsspi.security.cred.refreshGroups."

Figure 4:
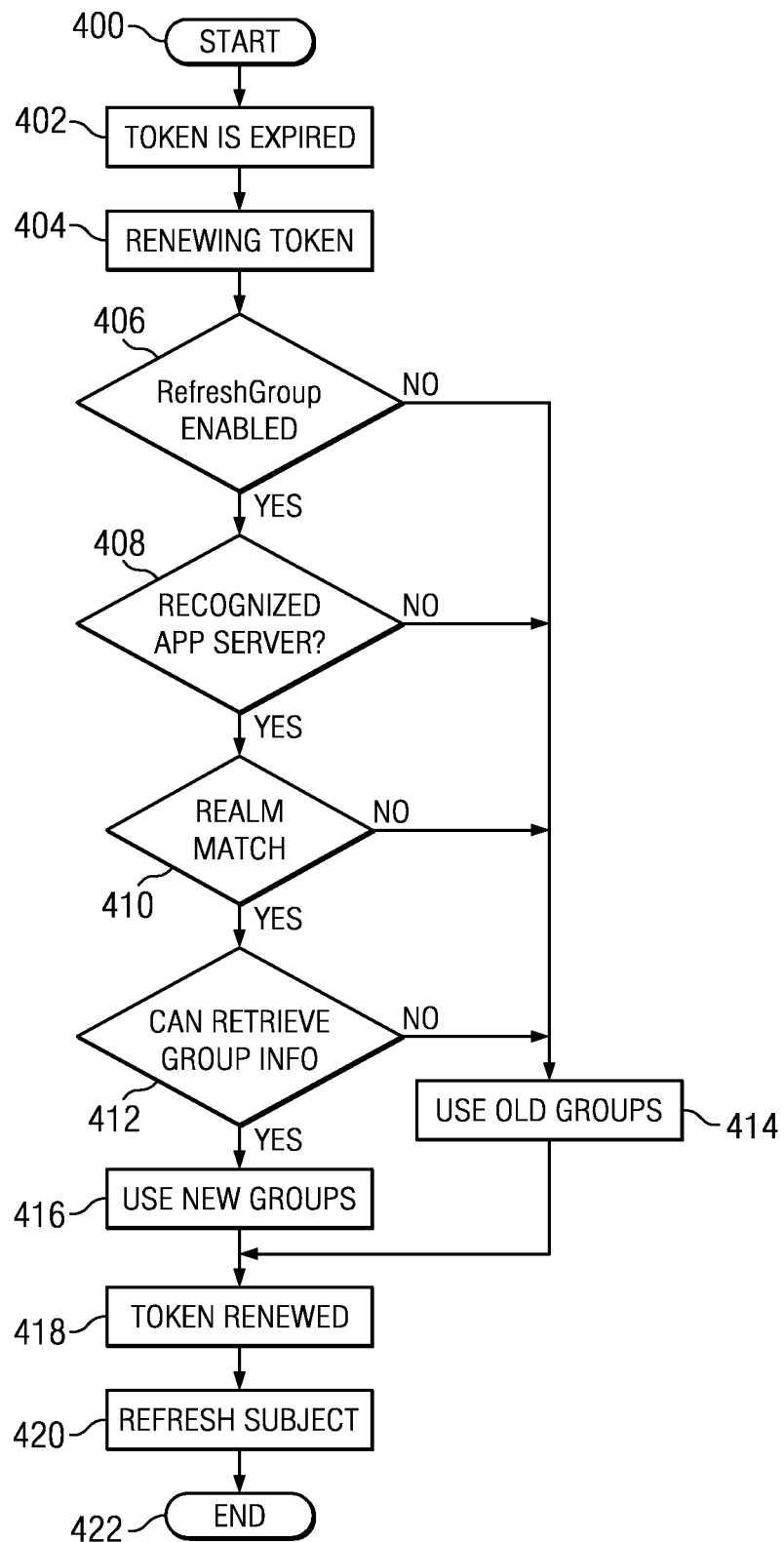
FIG. 4 is a simplified process flow diagram illustrating how an application server configured according to this disclosure is controlled to refresh group membership information for a Java Subject during refresh of a security token.

FIG. 4 illustrates an application server group membership refresh process according to this disclosure. This process assumes that the configuration option has been set, as described above. The implementation starts at step 400. At step 402, the application server checks whether a security token is expired. If so, the routine continues; otherwise, the routine ends. At step 404, and assuming the security token is expired, the application server checks to determine if the security token is being renewed. This step may be omitted if the security tokens renew by default. If the security token is renewable, the routine continues; otherwise, the routine ends. If the security token is expired and is the process of being renewed, a test is performed at step 406 to determine if the "refreshGroup" property is enabled? If the refreshGroup property is not enabled, as indicated by a negative outcome of the test at step 406, the routine continues at step 414 to use an existing (old) group membership. If, however, the refreshGroup property is enabled, as indicated by a positive outcome of the test at step 406, the routine branches to step 408 to test whether the Java Subject at issue was generated by an application server instance or type. Step 408 may simply determine that an "off-the-shelf" application server (such as an instance of WebSphere Application Server) generated the Java Subject. In the alternative, step 408 may be used to verify that a particular application server instance or type actually generated the Java Subject. In yet another alternative, step 408 may return an affirmative or positive response provided that the Java Subject does not include some custom property or value; this type of inquiry, without more, may be sufficient to establish that a custom application server did not generate the Subject in the first instance (or that, if a custom application server did generate the Subject, the Subject still does not include a custom property). Thus, step 408 tests to determine whether the Java Subject was generated for a particular token by a recognized or authorized application server as opposed to, say, a custom application server (or other source).

If the outcome of the test at step 408 is negative, the routine branches back to step 414 to use the existing group membership. If, however, the outcome of the test at step 408 is positive, the routine continues to step 410. At step 410, a test is performed to determine if the security realm of the credential token matches the security realm of a current runtime security configuration associated with the application server. If the outcome of the test at step 410 is negative, once again the routine branches back to step 414 to use the existing group membership. If, however, the outcome of the test at step 410 is positive, the routine continues at step 412. At this step, a final test is performed to determine whether group membership information can be retrieved. If the outcome of the test at step 412 is negative, the routine branches again to step 414 to use the existing group membership.

If, however, the outcome of the tests at step 406, 408, 410 and 412 are each positive, the routine continues at step 416 to retrieve and use new group membership information. This new group membership information is then used to renew (update) the security token (to create a new or renewed security token) at step 418. At step 420, a new (or updated) Subject is generated by refreshing the prior Subject. This completes the process, as indicated by step 422.

One of ordinary skill will appreciate that the particular ordering of steps 408, 410 and 412 in FIG. 4 is merely exemplary. These steps may be carried out in any particular order; thus, they should be considered "un-ordered" steps or operations. Further, in alternative embodiments, one or more of the step 408, 410 and 412 may be selectively omitted, although this is not a preferred implementation.

Further, while the disclosed technique has been described in the context of JEE and JEE Servlet 3.0 specification, this is not a limitation. The technique may be used for any application server that creates and maintains Subject-like identifiers and returns (to requesting client browsers) time-bounded, but renewable, security tokens, and where user group membership data is updated.

Techniques, products and services for defining, maintaining, managing and updating group membership information are beyond the scope of this disclosure. The application server group membership information refresh functionality assumes that such information is maintained in a data store and accessible to the application server as needed.

The subject matter described herein has significant advantages over the prior art. Previously, when a security context expired and was refreshed and restored, the user's group membership information (for the credentials associated with the security context) was not updated. Thus, any modification to the user's group membership that took place since the time the security context was created would not be honored. With the approach described herein, in contrast, modifications to group membership that have occurred since the security context was created may well be honored (under the circumstances described). The technique described herein enables a Java Subject to be associated continually with updated and correct group membership information where possible. The technique attempts to update the group membership information for a UserID associated with a security context. Moreover, if the group membership information cannot be update, the attempt to do so itself is not necessarily considered to be a failure.

Although not meant to be limiting, the group membership information refresh capability as described herein may be used either as a standalone function or in conjunction with an application programming interface (API) that allows for the Subject to be persisted and verified as a security context is restored and refreshed. In the latter scenario, if a validation of a userID associated with the security context fails, the security context is not recreated.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based environment. The secure web server itself may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the group membership refresh functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the application server group membership refresh components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the group membership refresh functionality described above.

Further, the group membership refresh functionality provided by the application server may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, Chrome or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like. Having described our invention, what we now claim is as follows.

The invention claimed is:

1. A method for refreshing group membership for an identifier associated with an authenticated user, comprising:
  configuring an option to control whether group membership information is refreshed during renewal of an expired security token associated with the identifier, the identifier representing a security context and generated to persist a user credential associated with the authenticated user;
  during renewal of an expired security token, determining whether the option is set to a given value;
  if the option is set to a given value, attempting to refresh group membership information associated with the identifier; and
  refreshing the identifier with any refreshed group membership information;

wherein at least one of the determining, attempting and refreshing operations is carried out in software executing on a hardware element.

2. The method as described in claim 1 further including renewing the security token with any refreshed group membership information.

3. The method as described in claim 1 wherein the step of attempting to refresh the group membership information includes checking to verify that a security realm in the security context matches a current realm.

4. The method as described in claim 1 wherein the step of attempting to refresh the group membership information includes checking to verify that the identifier was generated with a given application server type or instance.

5. The method as described in claim 1 wherein the step of attempting to refresh the group membership information includes determining whether group membership information can be retrieved.

6. The method as described in claim 5 further including using existing group membership information if the group membership information cannot be retrieved.

7. The method as described in claim 1 wherein the identifier is a Subject entity.

8. The method as described in claim 1 wherein the given value is set true so that group membership information is automatically attempted to be refreshed upon renewal of the security token.

9. Apparatus, comprising:
a processor;
computer memory holding computer program instructions that when executed by the processor perform a method for refreshing group membership for an identifier associated with an authenticated user, the identifier representing a security context and generated to persist a user credential associated with the authenticated user, the method comprising:
configuring an option to control whether group membership information is refreshed during renewal of an expired security token associated with the identifier;
during renewal of an expired security token, determining whether the option is set to a given value;
if the option is set to a given value, attempting to refresh group membership information associated with the identifier; and
refreshing the identifier with any refreshed group membership information.

10. The apparatus as described in claim 9 wherein the method further includes renewing the security token with any refreshed group membership information.

11. The apparatus as described in claim 9 wherein the step of attempting to refresh the group membership information includes checking to verify that a security realm in the security context matches a current realm.

12. The apparatus as described in claim 9 wherein the step of attempting to refresh the group membership information includes checking to verify that the identifier was generated with a given application server type or instance.

13. The apparatus as described in claim 9 wherein the step of attempting to refresh the group membership information includes determining whether group membership information can be retrieved.

14. The apparatus as described in claim 13 wherein the method further includes using existing group membership information if the group membership information cannot be retrieved.

15. The apparatus as described in claim 9 wherein the identifier is a Subject entity.

16. The apparatus as described in claim 9 wherein the given value is set true so that group membership information is automatically attempted to be refreshed upon renewal of the security token.

17. A computer program product in a non-transitory computer readable medium for use in a data processing system, the computer program product holding computer program instructions which, when executed by the data processing system, perform a method for refreshing group membership for an identifier associated with an authenticated user, the method comprising:
configuring an option to control whether group membership information is refreshed during renewal of an expired security token associated with the identifier, the identifier representing a security context and generated to persist a user credential associated with the authenticated user;
during renewal of an expired security token, determining whether the option is set to a given value;
if the option is set to a given value, attempting to refresh group membership information associated with the identifier; and
refreshing the identifier with any refreshed group membership information.

18. The computer program product as described in claim 17 wherein the method further includes renewing the security token with any refreshed group membership information.

19. The computer program product as described in claim 17 wherein the step of attempting to refresh the group membership information includes checking to verify that a security realm in the security context matches a current realm.

20. The computer program product as described in claim 17 wherein the step of attempting to refresh the group membership information includes checking to verify that the identifier was generated with a given application server type or instance.

21. The computer program product as described in claim 17 wherein the step of attempting to refresh the group membership information includes determining whether group membership information can be retrieved.

22. The computer program product as described in claim 21 wherein the method further includes using existing group membership information if the group membership information cannot be retrieved.

23. The computer program product as described in claim 17 wherein the identifier is a Subject entity.

24. The computer program product as described in claim 17 wherein the given value is set true so that group membership information is automatically attempted to be refreshed upon renewal of the security token.

25. An application server, comprising:
a processor;
computer memory holding computer program instructions that when executed by the processor perform a method for refreshing group membership for an identifier associated with an authenticated user, the identifier representing a security context and generated to persist a user credential associated with the authenticated user, the method comprising:
during renewal of an expired security token associated with the identifier, attempting to refresh group membership information associated with the identifier by the following unordered sub-steps:
determining is a security realm in the security context matches a current realm;
determining if the identifier was generated with a given application server type or instance; and determining if updated group membership information can be retrieved; and if a security realm in the security context matches a current realm, if the identifier was generated with a given application server type or instance, and if updated group membership information can be retrieved, refreshing the identifier with the updated group membership information; and renewing the security token with the updated group membership information.

* * * * *